(12) United States Patent
Yuan et al.

(10) Patent No.: US 10,612,211 B2
(45) Date of Patent: Apr. 7, 2020

(54) CONTROL LEVER DEVICE FOR CONSTRUCTION MACHINE

(71) Applicant: Hitachi Construction Machinery Co., Ltd., Taito-ku, Tokyo (JP)

(72) Inventors: Guoliang Yuan, Shanghi (CN); Wataru Isaka, Mito (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 133 days.

(21) Appl. No.: 15/914,779

(22) Filed: Mar. 7, 2018

(65) Prior Publication Data

US 2018/0282971 A1 Oct. 4, 2018

(30) Foreign Application Priority Data

Mar. 29, 2017 (JP) .................... 2017-65526

(51) Int. Cl.
| | |
|---|---|
| *E02F 9/20* | (2006.01) |
| *E02F 9/24* | (2006.01) |
| *G05G 5/00* | (2006.01) |
| *B60N 2/75* | (2018.01) |
| *G05G 1/62* | (2008.04) |
| *G05G 1/04* | (2006.01) |

(52) U.S. Cl.
CPC ............ *E02F 9/2004* (2013.01); *B60N 2/767* (2018.02); *B60N 2/77* (2018.02); *B60N 2/797* (2018.02); *E02F 9/24* (2013.01); *G05G 5/005* (2013.01); *G05G 1/04* (2013.01); *G05G 1/62* (2013.01)

(58) Field of Classification Search
CPC .......... E02F 9/2004; E02F 9/24; G05G 5/005; G05G 1/04
See application file for complete search history.

(56) References Cited

U.S. PATENT DOCUMENTS

| | | | | |
|---|---|---|---|---|
| 4,646,869 A | * | 3/1987 | Kerner, Jr. ............. | B60K 26/00 180/334 |
| 6,971,194 B2 | * | 12/2005 | McClelland .......... | E02F 9/2004 172/431 |

FOREIGN PATENT DOCUMENTS

| | | | | |
|---|---|---|---|---|
| JP | 05214740 A | * | 8/1993 | ............ E02F 9/2004 |
| JP | 5-81360 U | | 11/1993 | |

(Continued)

OTHER PUBLICATIONS

Korean-language Office Action issued in counterpart Korean Application No. 10-2018-0024667 dated Jul. 22, 2019 with English translation (eight pages).

*Primary Examiner* — Thomas C Diaz
(74) *Attorney, Agent, or Firm* — Crowell & Moring LLP

(57) ABSTRACT

A lock mechanism is provided in front of each of left and right consoles to fix the console in an optional position. Each of the lock mechanisms is provided with a lock release lever for selecting a lock state of fixing the console and a lock release state of releasing fixation of the console. Each of the lock release levers is provided to extend outward in a left-right direction from the lock mechanism. The lock state is defined by an inclined posture in which a tip end side of the lock release lever is in an oblique downward direction and the lock release state is defined by a horizontal posture in which the tip end sides of the lock release lever is rotated in an upward direction. A hand hold part is provided in front of each of the consoles and above each of the lock release levers to swing the console in the upper-lower direction in the lock release state.

4 Claims, 12 Drawing Sheets

(56) References Cited

FOREIGN PATENT DOCUMENTS

| JP | 09291564 A | * | 11/1997 | ............ E02F 9/2004 |
| JP | 10266270 A | * | 10/1998 | ............ E02F 9/2004 |
| JP | 2005-248580 A | | 9/2005 | |
| JP | 2008-063891 | | 3/2008 | |

* cited by examiner

CONTROL LEVER DEVICE FOR CONSTRUCTION MACHINE

TECHNICAL FIELD

The present invention relates to a control lever device for a construction machine used in a construction machine such as a hydraulic excavator, for example.

BACKGROUND ART

In general, a hydraulic excavator as construction machines is configured of an automotive lower traveling structure, an upper revolving structure that is mounted on the lower traveling structure to be capable of revolving thereon through a revolving device and a front device that is mounted on the upper revolving structure to be capable of tilting and lifting thereto.

A cab in which an operator gets onboard is provided on the front side of the upper revolving structure. The cab is provided therein with an operator's seat on which an operator sits, left and right control lever devices for work that are positioned in both left and right sides of the operator's seat to control the front device and the revolving device, and left and right control lever/pedals for travel that are positioned in front of the operator's seat to control travel of the lower traveling structure.

Here, operators of various body shapes are seated on the operator's seat. Therefore, there are some left and right control lever devices a height position of which can be adjusted to the operator's seat for enabling the operator to control the front device and the revolving device in a comfortable posture. Each of the control lever devices the height position of which can be adjusted includes a console a front side of which can swing in an upper-lower direction about a rear side as a fulcrum attached on a fixed frame, a control lever that is provided on each of the consoles to control the front device, an urging member that urges the console such that the front side of the console swings toward the upper side, and a lock mechanism that is provided in the console to fix the console in an optional position. In addition, an adjusting lever for controlling fixation of the console and release of the fixation by the lock mechanism is provided in a rear position of the control lever to project upward (Patent Document 1).

According to Patent Document 1, in a case of adjusting the height of the control lever, the fixation of the console by the lock mechanism is released by controlling the adjusting lever with one hand. In this lock release state, the console is caused to swing with the other hand to be adjusted to an appropriate height position, and the adjusting lever is caused to be controlled with the one hand to lock the console.

PRIOR ART DOCUMENT

Patent Document

Patent Document 1: Japanese Patent Laid-Open No. 2008-63891 A

SUMMARY OF THE INVENTION

Incidentally, according to Patent Document 1, in a case of performing the height adjustments of the left and right control lever devices respectively, both hands are required for the control of the adjusting lever and the swinging movement of the console. Therefore, the height adjustments of the left and right control lever devices must be performed one by one, leading to a problem that a working time for adjustment becomes long.

In addition, in a case of performing the height adjustments of the left and right control lever devices one by one, it is difficult to adjust one of the height positions of the left and right control lever devices to the other, which also leads to a problem that the working time for adjustment becomes long.

The present invention is made in view of the aforementioned problems in the conventional technology, and an object of the present invention is to provide a control lever device for a construction machine that can perform height adjustments of left and right control lever devices each with one hand to shorten a working time for height adjustment.

A control lever device for a construction machine according to the present invention comprising: left and right consoles that are arranged on both left and right sides of an operator's seat and a front side of which can swing in an upper-lower direction about a rear side as a fulcrum attached on a fixed frame; control levers that are provided on the left and right consoles to control a front device; and urging members that urge the respective consoles configuring the left and right consoles such that the front sides of the left and right consoles swing upward, characterized in that: a lock mechanism is provided in front of each of the consoles to fix the console in an optional position; a lock release lever is provided on each of the lock mechanisms to select a lock state of fixing the console and a lock release state of releasing the fixation of the console, the lock release lever being provided to extend outward in a left-right direction to the operator's seat from the lock mechanism, the lock state being defined by an inclined posture in which a tip end side of the lock release lever is in an oblique downward direction and the lock release state being defined by a horizontal posture in which the lock release lever is rotated in an upward direction from the inclined posture; and a hand hold part is provided in front of each of the consoles and above each of the lock release levers to cause the console to swing in the upper-lower direction in the lock release state in which the fixation of the console is released by the lock release lever.

According to the present invention, the height adjustment of the control lever device can be performed with one hand to shorten a working time for the height adjustment.

MODE FOR CARRYING OUT THE INVENTION

Hereinafter, an explanation will be in detail made of a control lever device for a construction machine according to an embodiment in the present invention with reference to FIG. 1 to FIG. 12, by taking a control lever device for a hydraulic excavator as a construction machine as an example.

Figure 1:
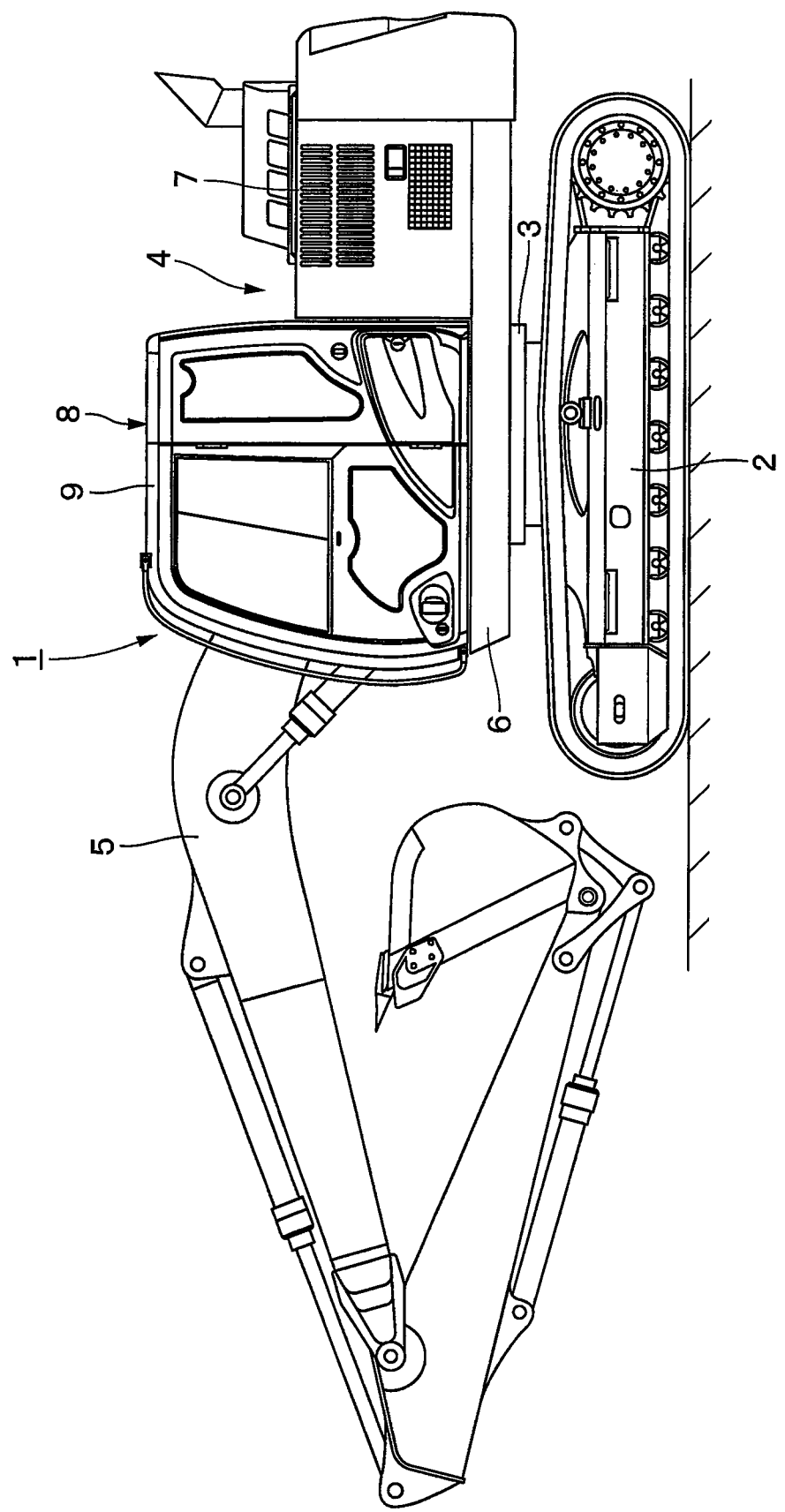
FIG. 1 is a front view showing a hydraulic excavator that is applied to an embodiment in the present invention.

In FIG. 1, a hydraulic excavator 1 as a construction machine includes an automotive lower traveling structure 2, an upper revolving structure 4 that is supported on the lower traveling structure 2 to be capable of revolving thereon through a revolving device 3 and a front device 5 that is mounted in the front side of the upper revolving structure 4 to be capable of tilting and lifting thereto and performs an excavating work of earth and sand, and/or the like.

The upper revolving structure 4 includes a revolving frame 6 as a base, an exterior cover 7 that covers an engine, a hydraulic pump, a heat exchanger, a control valve and the like (any of them is not shown) which are mounted on the revolving frame 6, and a cab 8 that is arranged in a left front part of the revolving frame 6. The cab 8 is formed in a box shape by covering the lower side of a cab box 9 with a floor member 10 (see FIG. 2 and FIG. 3), for example. An operator's seat 17, a left control lever device 18 and a right control lever device 19, which will be described later, are provided on the floor member 10.

The floor member 10 is formed as a rectangular plate body elongated in a front-rear direction, and an operator's seat support platform 11 is provided in an intermediate position thereof in the front-rear direction. The operator's seat support platform 11 configures a base that supports the operator's seat 17 to be adjustable in position. The operator's seat support platform 11 includes a support base 11A that is formed in a box shape flat in an upper-lower direction, and a position adjusting mechanism 11B that is provided on the support base 11A to position-adjust the operator's seat 17, the left control lever device 18 and the right control lever device 19 in the front-rear direction and in the upper-lower direction, and a later-described fixed frame 12 that is provided on the position adjusting mechanism. 11B. For example, the position adjusting mechanism 11B is provided with a suspension mechanism (not shown) for a ride quality improvement on the operator's seat 17.

Here, the position adjusting mechanism 11B moves the operator's seat 17 together with the left control lever device 18 and the right control lever device 19. On the other hand, operators of various body shapes sit on the operator's seat 17. As a result, optimal positions of control levers 37, 21 differ depending upon operators each. Therefore, the left and right control lever devices 18, 19 are configured to be capable of position-adjusting front parts thereof on which the control levers 37, 21 are provided, in the upper-lower position to the operator's seat 17.

Figure 4:
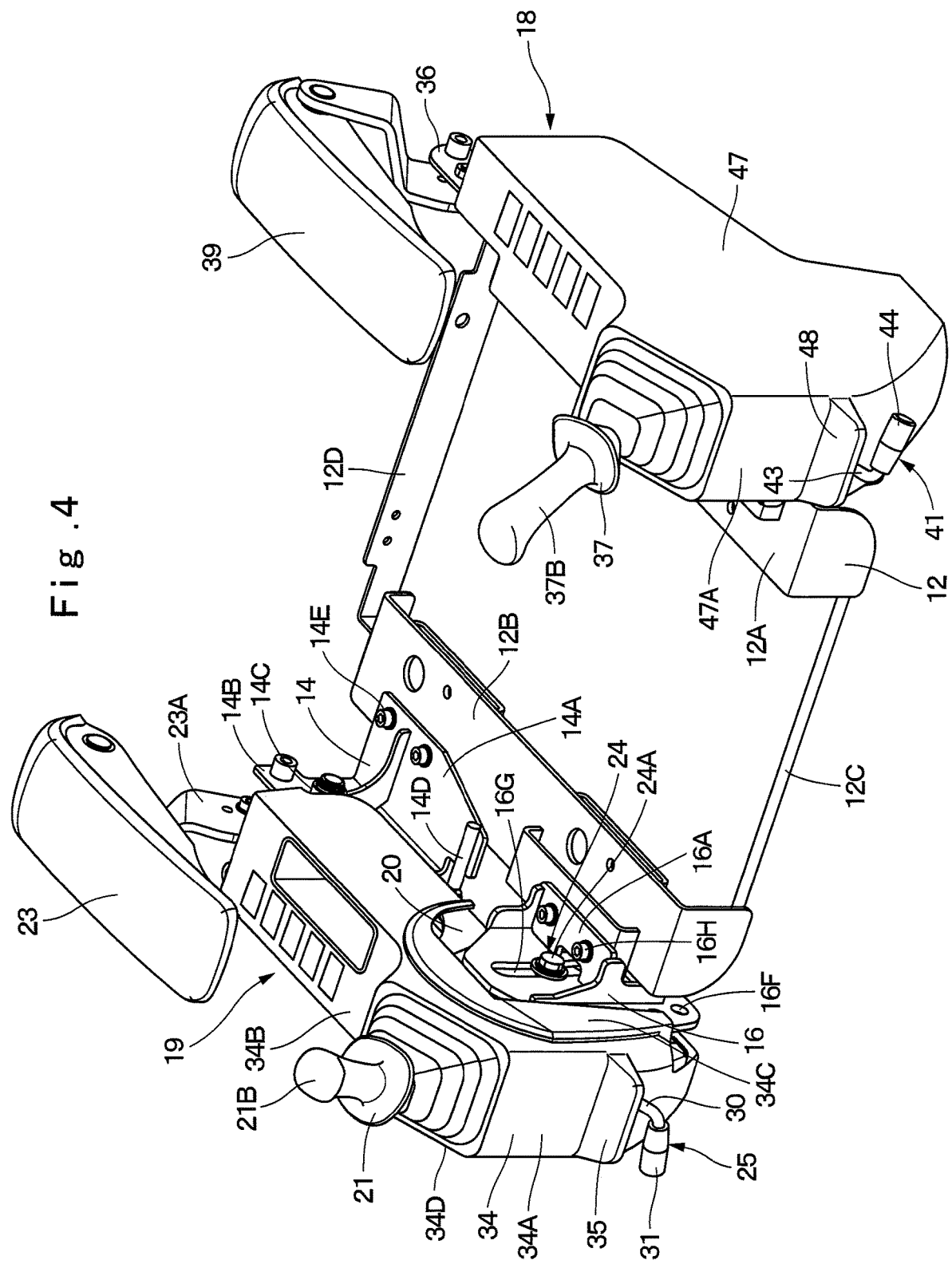
FIG. 4 is a perspective view showing the fixed frame, the left control lever device and the right control lever device in FIG. 2 in an enlarged manner.
Figure 5:
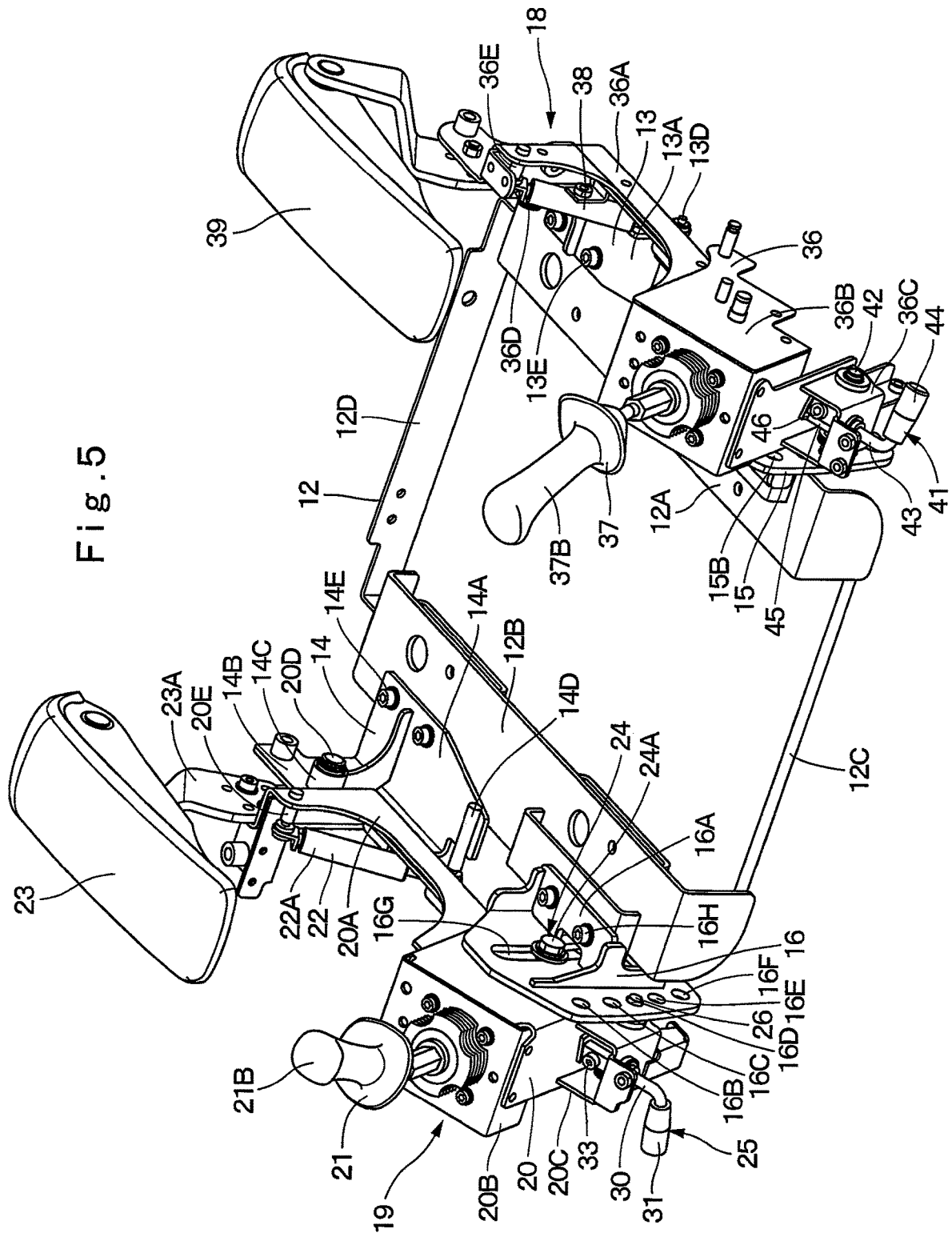
FIG. 5 is a perspective view showing the fixed frame, the left control lever device and the right control lever device with a console cover being removed.

The fixed frame 12 of the operator's seat support platform 11 is arranged on the upper side of the position adjusting mechanism 11B, and is provided as a mounting base for mounting the operator's seat 17 and the respective control lever devices 18, 19. As shown in FIG. 4 and FIG. 5, the fixed frame 12 includes a left base frame 12A and a right base frame 12B that are arranged to be spaced from each other in the left-right direction to extend in the front-rear direction. The left base frame 12A and the right base frame 12B are coupled integrally by a front coupling frame 12C and a rear coupling frame 12D that extend in the left-right direction. The operator's seat 17 is mounted on the respective base frames 12A, 12B.

Figure 6:
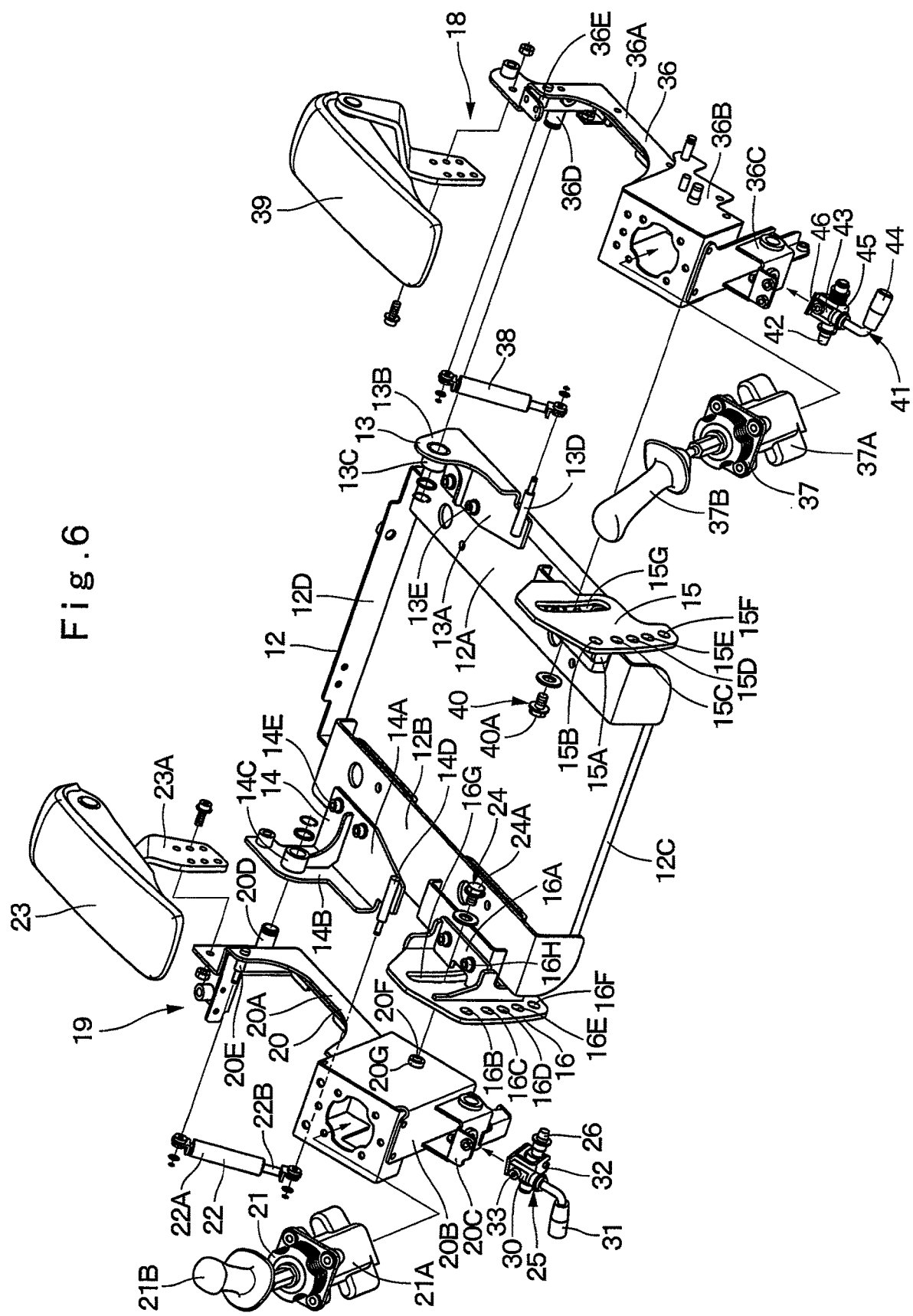
FIG. 6 is an exploded perspective view showing the left control lever device and the right control lever device in FIG. 5 in an exploded manner, together with the fixed frame.

As shown in FIG. 6, a left console support bracket 13 is provided on the rear side of the left base frame 12A. A right console support bracket 14 is provided on the rear side of the right base frame 12B. Here, the left console support bracket 13 and the right console support bracket 14 are formed to be symmetric to each other in the left-right direction. Therefore, an explanation will be in detail made of the configuration of the right console support bracket 14, and an explanation of the configuration of the left console support bracket 13 is to be omitted by adding the reference numerals corresponding to respective components in the right console support bracket 14.

Figure 7:
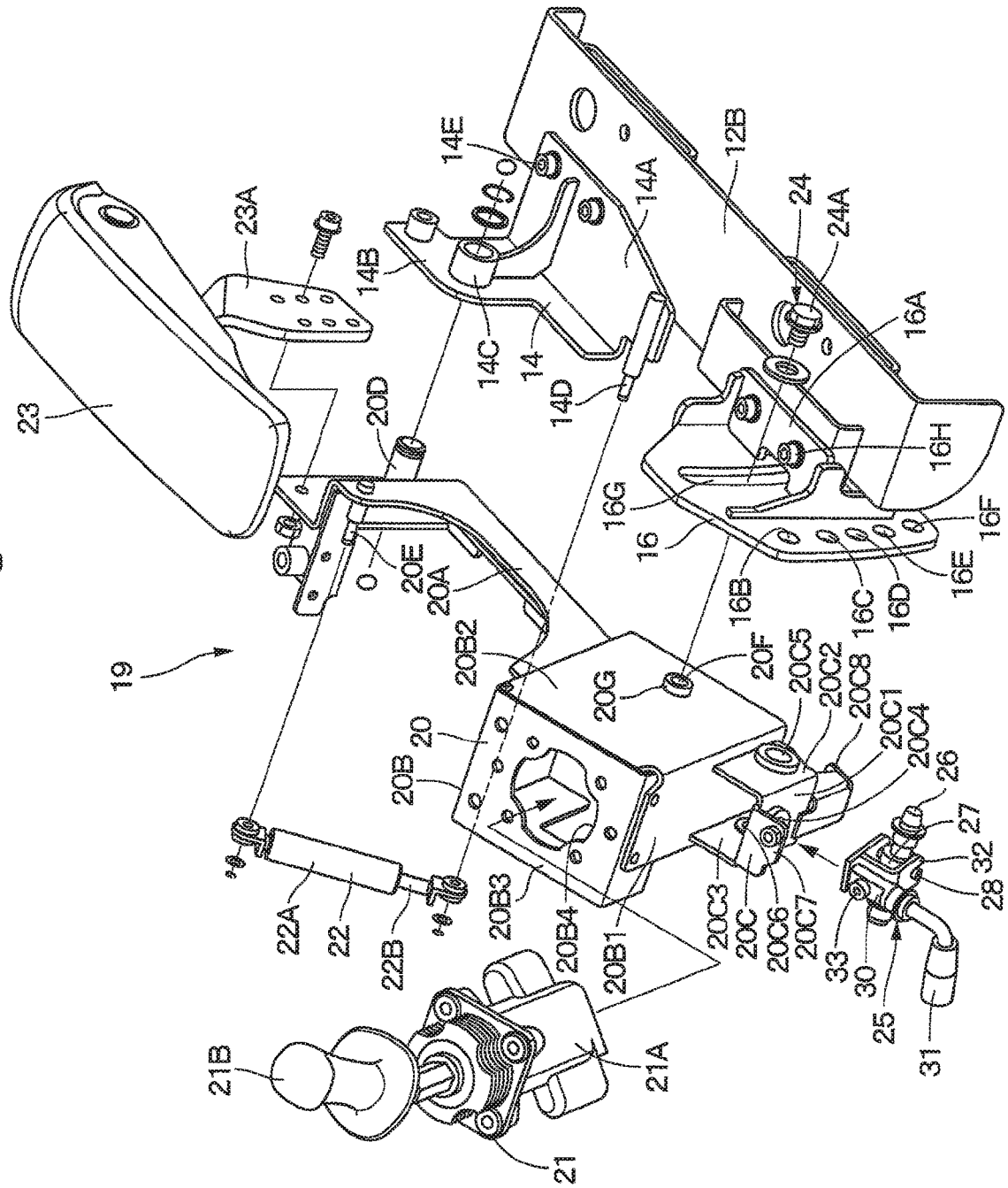
FIG. 7 is an exploded perspective view showing a right part of the fixed frame and the exploded right control lever device in FIG. 6 in an enlarged manner.
Figure 8:
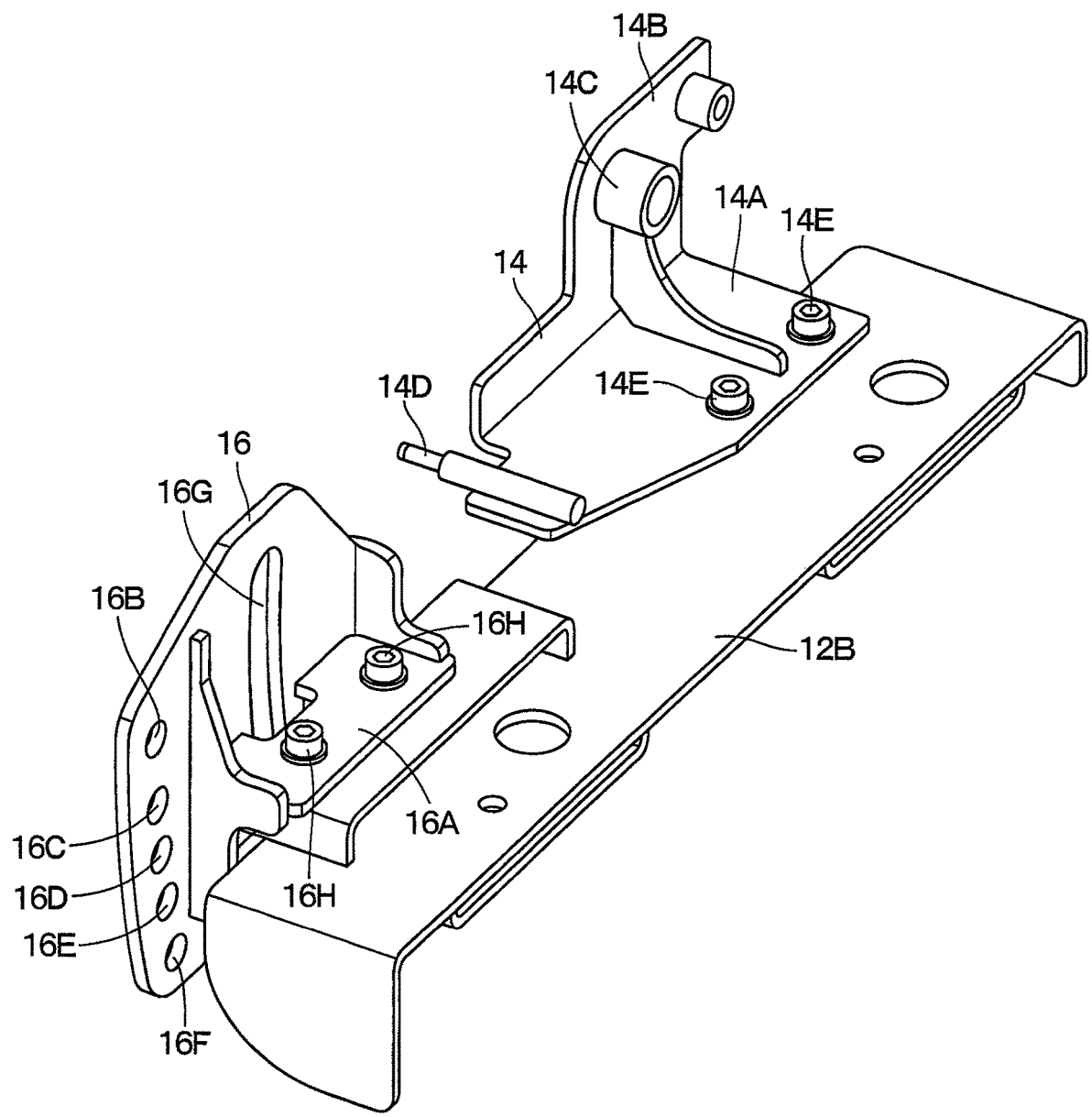
FIG. 8 is a perspective view showing a state where a right base frame of the fixed frame, a right console support bracket and a right front vertical plate are assembled in an enlarged manner.

As shown in FIG. 7 and FIG. 8, the right console support bracket 14 is formed of a flat surface part 14A and a vertical surface part 14B arranged vertically from the outer side of the flat surface part 14A in the left-right direction. A support tube 14C is provided in a rear position of the vertical surface part 14B and in a position higher than the flat surface part 14A, and is formed of a tubular body extending in the left-right direction. A position of a center axial line O-O (see FIG. 7) of the support tube 14C is a position of a fulcrum at the time of swinging a right console 20. In addition, a damper mounting part 14D is provided in a front position of the flat surface part 14A, and the damper mounting part 14D projects outward in the left-right direction. A support shaft 20D of the right console 20 is inserted/attached in the support tube 14C. A tip end of a rod 22B of a right damper 22 to be described later is mounted in a tip end part of the damper mounting part 14D.

The flat surface part 14A of the right console support bracket 14 is mounted on the right base frame 12B by using two bolts 14E, for example. In this case, the right console support bracket 14 can be adjusted in position in the left-right direction by forming a bolt insertion groove elongated in the left-right direction in the flat surface part 14A. This adjusting function can be applied also to the left console support bracket 13, a left front vertical plate 15 and a right front vertical plate 16.

It should be noted that the left console support bracket 13 includes, as similar to the right console support bracket 14, a flat surface part 13A, a vertical surface part 13B, a support tube 13C and a damper mounting part 13D, and is mounted to the left base frame 12A by using two bolts 13E. A support shaft 36D of the left console 36 is inserted/attached in the support tube 13C. A rod side of a left damper 38 to be described later is mounted in a tip end part of the damper mounting part 13D.

As shown in FIG. 6, the left front vertical plate 15 is provided in the front side of the left base frame 12A. The right front vertical plate 16 is provided in the front side of the right base frame 12B. Here, the left front vertical plate 15 and the right front vertical plate 16 are formed to be symmetric to each other in the left-right direction. Therefore, an explanation will be in detail made of the configuration of the right front vertical plate 16, and an explanation of the configuration of the left front vertical plate 15 is to be omitted by adding the reference numerals corresponding to respective components of the right front vertical plate 16.

As shown in FIG. 8, the right front vertical plate 16 is formed as a vertical plate body facing an inner surface part 20B2 of a lever mounting frame 20B provided in the right console 20 to be described later. A mounting part 16A is provided on an inner surface side (right base frame 12B-side) of the right front vertical plate 16 in the left-right direction to extend horizontally. A plurality of, for example, five engaging holes 16B to 16F are formed on the front position in the right front vertical plate 16. In addition, a guide groove 16G is formed in an intermediate position of the right front vertical plate 16 in the front-rear direction. The mounting part 16A of the right front vertical plate 16 is mounted on the right base frame 12B by using two bolts 16H, for example. It should be noted that 2 to 4 or more engaging holes may be provided.

The five engaging holes 16B to 16F configure a part of a right lock mechanism 25 to be described later. The respective engaging holes 16B to 16F are arranged along an arc having a radius from a center axial line O-O of the support tube 14C of the right console support bracket 14 to the front position of the right front vertical plate 16 at the center of the center axial line O-O. The engaging holes 16B to 16F are respectively formed as round holes that are spaced by desired intervals in the upper-lower direction and penetrate through the right front vertical plate 16 in the plate thickness direction (in the left-right direction). A tip end part 26B of a lock pin 26 to be described later can be selectively inserted in each of the engaging holes 16B to 16F.

The guide groove 16G configures a part of a right guide mechanism 24 to be described later. The guide groove 16G is positioned in back of the respective engaging holes 16B to 16F to extend in the upper-lower direction. Specifically, the guide groove 16G is formed as an arc groove (curved groove) along an arc at the center of the center axial line O-O of the support tube 14C of the right console support bracket 14.

It should be noted that, as shown in FIG. 6, the left front vertical plate 15 has, as similar to the right front vertical plate 16, a mounting part 15A, respective engaging holes 15B to 15F and a guide groove 15G, and is mounted on the left base frame 12A by using two bolts (not shown). The respective engaging holes 15B to 15F configure a part of a left lock mechanism 41 to be described later. The guide groove 15G configures a part of the left guide mechanism 40 to be described later.

Figure 2:
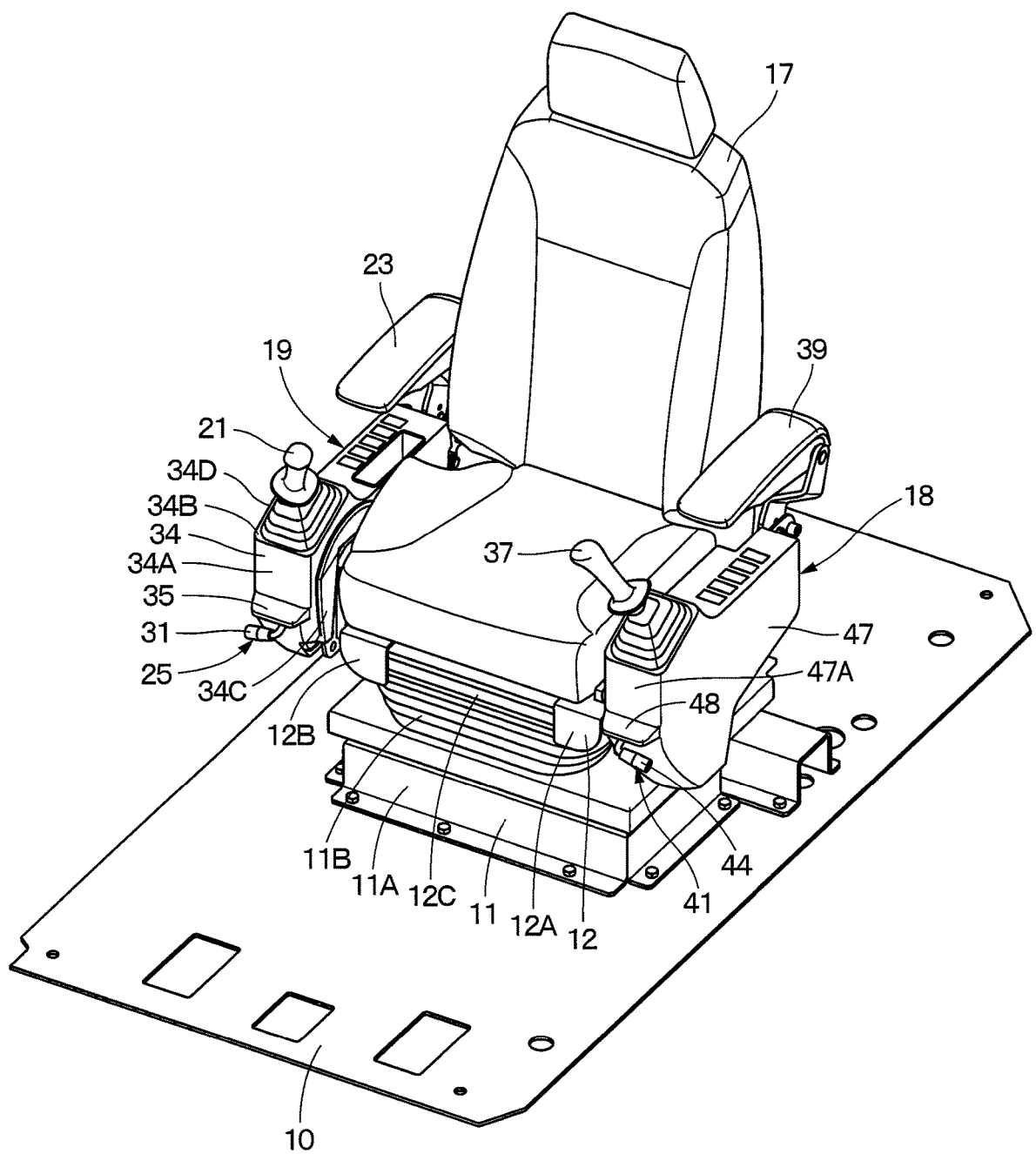
FIG. 2 is a perspective view showing a floor member, an operator's seat support platform, a fixed frame, an operator's seat, a left control lever device and a right control lever device according to the embodiment.

As shown in FIG. 2, the operator's seat 17 is arranged on the operator's seat support platform 11. The operator's seat 17 is a seat for an operator to sit on, and is mounted on the respective base frames 12A, 12B of the fixed frame 12.

Next, an explanation will be made of the configuration of the left control lever device 18 and the right control lever device 19 in the hydraulic excavator 1 as the control lever device for the construction machine according to the present embodiment. Here, the left control lever device 18 and the right control lever device 19 are formed to be symmetric to each other in the left-right direction. Therefore, an explanation will be in detail made of the configuration of the right control lever device 19, and an explanation of the configuration of the left control lever device 18 is to be omitted by adding the reference numerals corresponding to respective components in the right control lever device 19 except for a component relating to the present invention (the left lock mechanism 41).

As shown in FIG. 4 to FIG. 7, the right control lever device 19 is positioned in the right side to the operator's seat 17 to be mounted on the fixed frame 12. The right control lever device 19 includes the right console 20, the right control lever 21, the right damper 22, the right guide mechanism 24, the right lock mechanism 25 and the right hand hold part 35.

Figure 9:
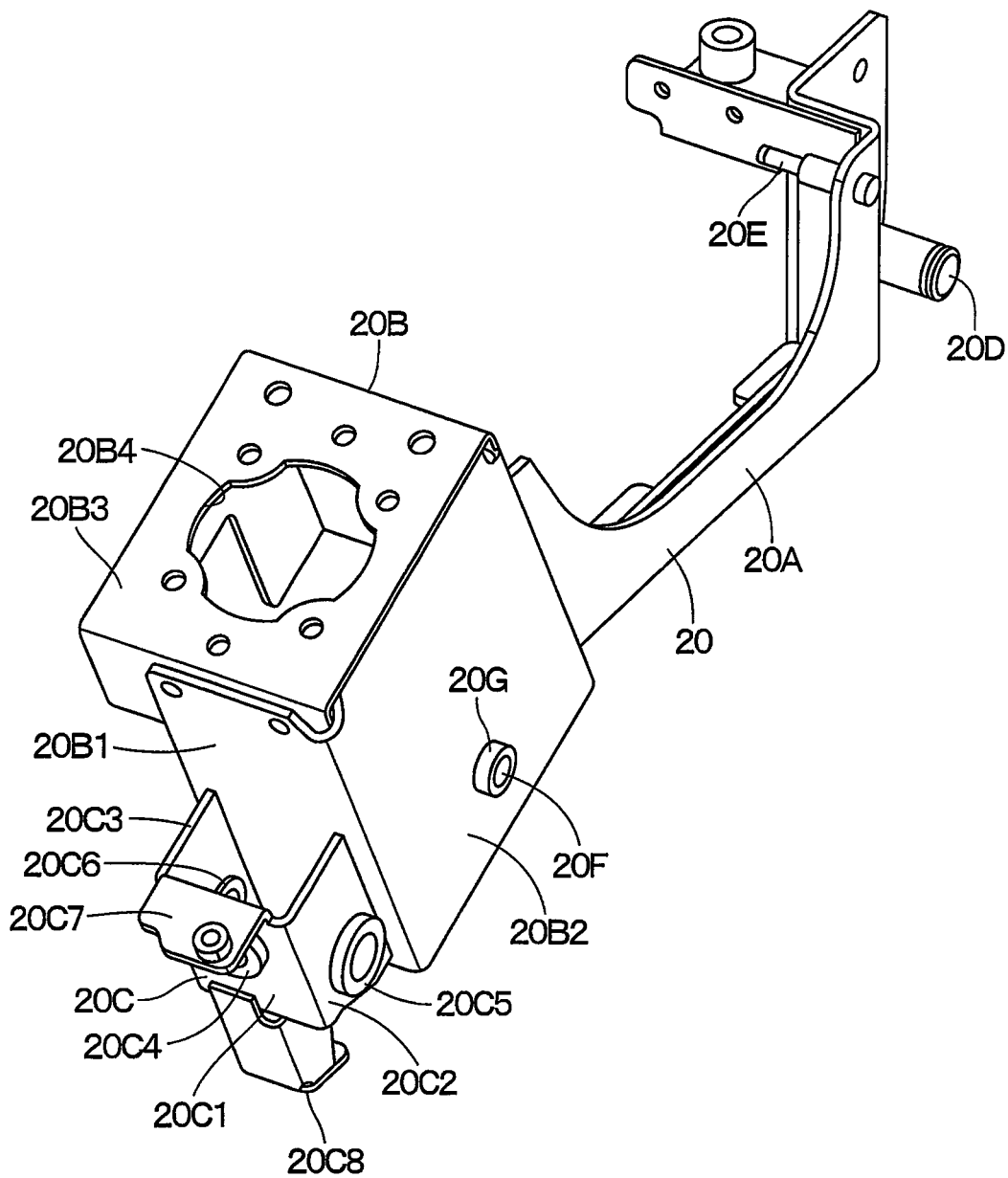
FIG. 9 is a perspective view showing a right console in the right control lever device as a single unit in an enlarged manner.

The right console 20 configures a console together with the left console 36. The right console 20 is arranged in the right side to the operator's seat 17 in the left-right direction. As shown in FIG. 7 and FIG. 9, the right console 20 is designed such that the front side can swing in the upper-lower direction about the rear side of the right console support bracket 14 as a fulcrum mounted on the fixed frame 12.

The right console 20 includes a main frame 20A extending in the front-rear direction, a box-shaped lever mounting frame 20B provided in the front part of the main frame 20A, and a lock case 20C provided on the front surface part 20B1 of the lever mounting frame 20B. The support shaft 20D projecting toward the inner side in the left-right direction is provided on the rear side of the main frame 20A. In addition, a damper mounting part 20E is provided in the rear side of the main frame 20A, and the damper mounting part 20E is positioned closer to the upper side and the front side than the support shaft 20D to project outward in the left-right direction.

The inner surface part 20B2 is provided in the inner position of the lever mounting frame 20B in the left-right direction. The inner surface part 20B2 is provided with a screw hole 20F in a position corresponding to the guide groove 16G of the right front vertical plate 16. A guide bolt 24A of the right guide mechanism 24 to be described later is screwed into the screw hole 20F. Here, the screw hole 20F is arranged in the center position of a circular seat 20G projecting to the inner side (the left side in the left-right direction) from the inner surface part 20B2. A thickness dimension (axial height dimension) of the circular seat 20G is set to be slightly greater than a thickness dimension of the right front vertical plate 16. Therefore, the right front vertical plate 16 can be retained with a slight clearance between the inner surface part 20B2 and the head part of the guide bolt 24A. On the other hand, a top surface part 20B3 of the lever mounting frame 20B is for the mounting of the right control lever 21 to be described later, and is provided with a lever insertion opening 20B4 formed in the center.

The lock case 20C is formed by bending both end sides of a rectangular plate material in the length direction in a C-letter shape or in a U-letter shape. The lock case 20C has a front surface 20C1, an inner surface 20C2 positioned in the inner side in the left-right direction and an outer surface 20C3 positioned in the outer side in the left-right direction. The front surface 20C1 of the lock case 20C is provided with a bearing 20C4 in which a rotating shaft 30 of the right lock mechanism 25 is inserted to be rotatable. On the other hand, the inner surface 20C2 is provided thereon with a pin receiver 20C5 in which a tip end side of the lock pin 26 is inserted. In addition, the outer surface 20C3 is provided thereon with a pin receiver 20C6 that is positioned to be coaxial with the pin receiver 20C5 and in which a base end side of the lock pin 26 is inserted.

Further, the lock case 20C is provided thereon with a cover mounting seat 20C7 in the upper position of the front surface 20C1 and a cover mounting seat 20C8 in the lower position of the front surface 20C1. Bolts (not shown) for mounting a front part of a right console cover 34 to be described later are screwed in the cover mounting seats 20C7, 20C8.

As shown in FIG. 7, the support shaft 20D of the right console 20 is rotatably inserted in the support tube 14C of the right console support bracket 14 mounted on the fixed frame 12. Accordingly, the right console 20 can be adjusted in height position by swinging the front side in the upper-lower direction at the center of the support shaft 20D (center axial line O-O).

The right control lever 21 configures a control lever together with the left control lever 37. The right control lever 21 is provided on the lever mounting frame 20B of the right console 20. The right control lever 21 controls at least one of the revolving device 3 and the front device 5. The right control lever 21 includes a pilot valve 21A of a pressure reducing valve type mounted on the top surface part 20B3 of the lever mounting frame 20B, and a lever part 21B extending upward from the pilot valve 21A through the lever insertion opening 20B4. The pilot valve 21A is connected to a control valve through a pilot hose (any of them is not shown).

The right damper 22 configures a damper together with the left damper 38. The right damper 22 is provided between the right console support bracket 14 in the fixed frame 12-side and the main frame 20A of the right console 20. The right damper 22 configures an urging member that urges the right console 20 for the front side of the right console 20 to swing toward the upper side. The right damper 22 is formed as a gas spring, for example, and has a tube 22A-side that is mounted to the damper mounting part 20E of the right console 20 and a rod 22B-side that is mounted to the damper mounting part 14D of the right console support bracket 14.

The right armrest 23 is for an operator to rest his/her right elbow on, and is arranged in the right side to the operator's seat 17. The right armrest 23 is mounted in a state where a bracket 23A in the rear side thereof is adjustable in height to the rear part of the main frame 20A in the right console 20.

The right guide mechanism 24 configures a guide mechanism together with the left guide mechanism 40. The right guide mechanism 24 is provided between the right front vertical plate 16 in the fixed frame 12-side and the lever mounting frame 20B of the right console 20. The right guide mechanism 24 guides the right console 20 to move along the right front vertical plate 16 without shaking in the left-right direction when the front side of the right console 20 is caused to swing in the upper-lower direction. The right guide mechanism 24 includes the guide groove 16G provided in the aforementioned right front vertical plate 16, the screw hole 20F provided in the inner surface part 20B2 of the lever mounting frame 20B and the guide bolt 24A that is inserted in the guide groove 16G to be screwed in the screw hole 20F.

Accordingly, the right guide mechanism 24 enables the front side of the right console 20 to swing in the upper-lower direction by the guide groove 16G. Based upon this structure, the right guide mechanism 24 can guide the right console 20 such that the front side of the right console 20 does not shake in the left-right direction by holding the right front vertical plate 16 to have a slight clearance between the inner surface part 20B2 of the lever mounting frame 20B and the head part (washer) of the guide bolt 24A.

Figure 10:
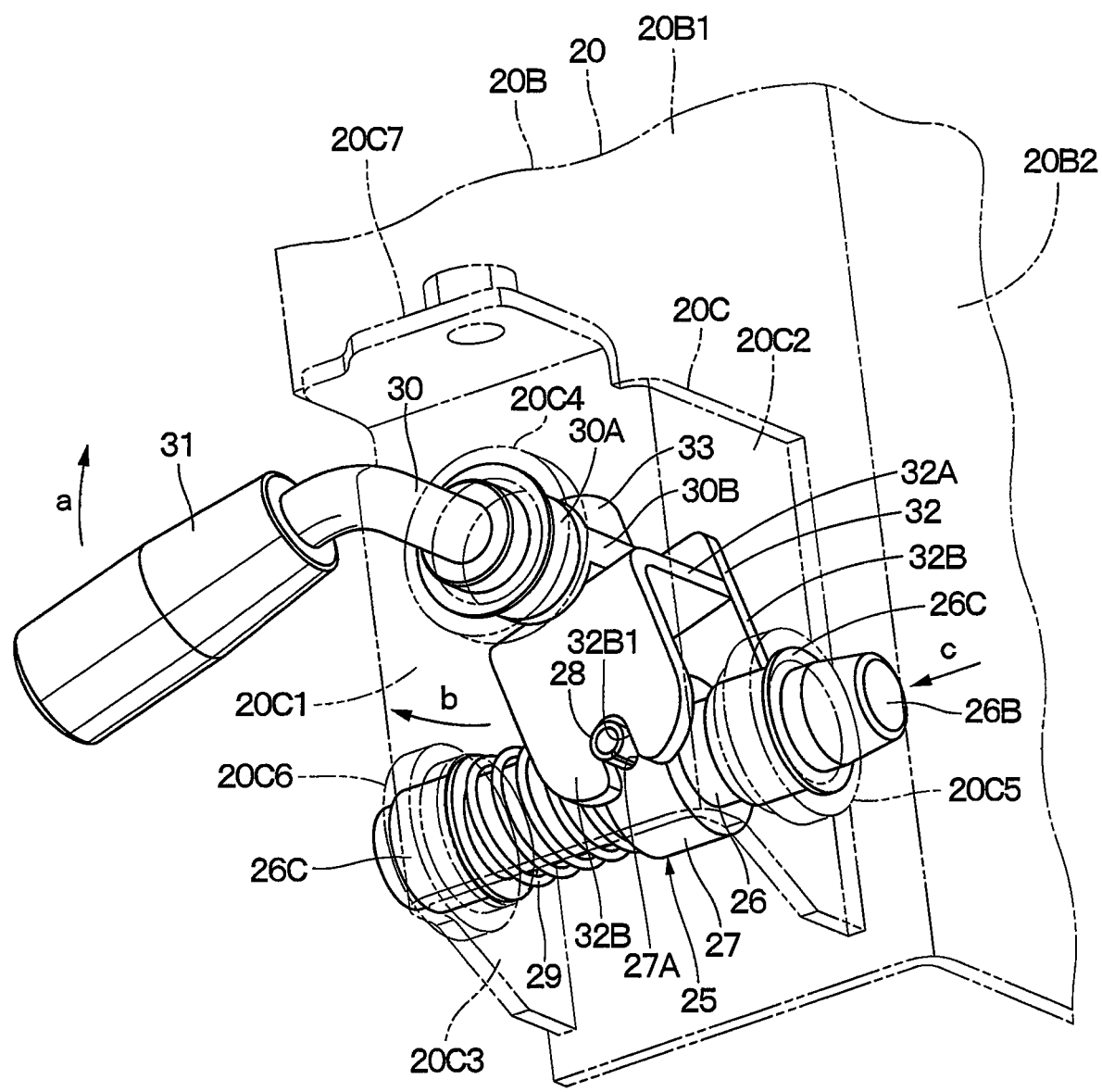
FIG. 10 is a perspective view showing a front part of the right console in the right control lever device in a virtual line and a moving part of a right lock mechanism in a solid line
Figure 11:
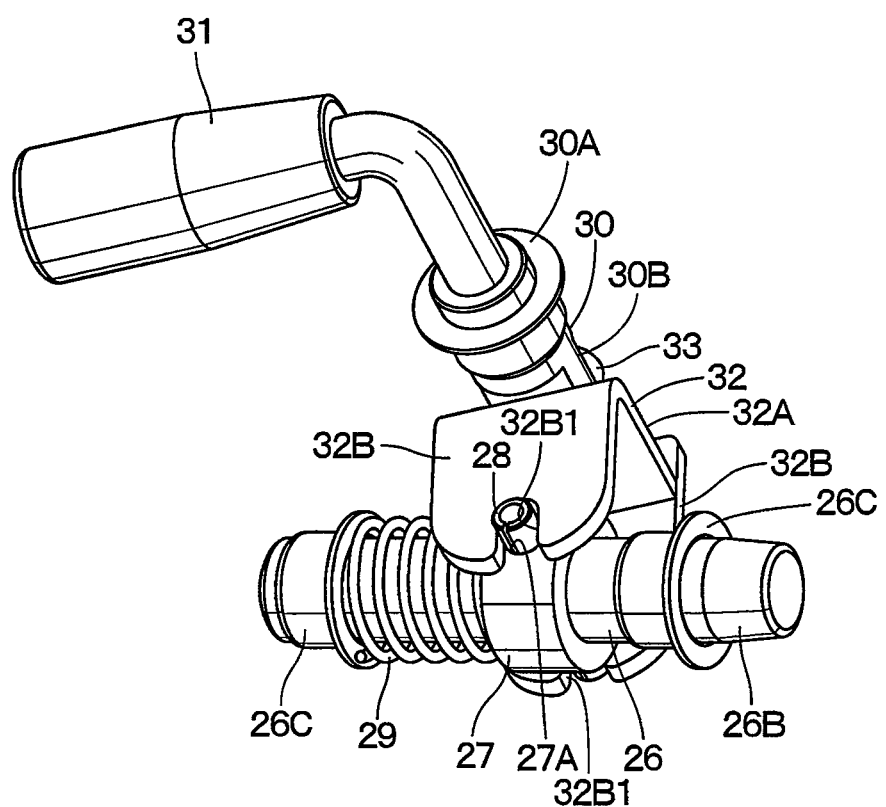
FIG. 11 is a perspective view showing a moving part of the lock mechanism.
Figure 12:
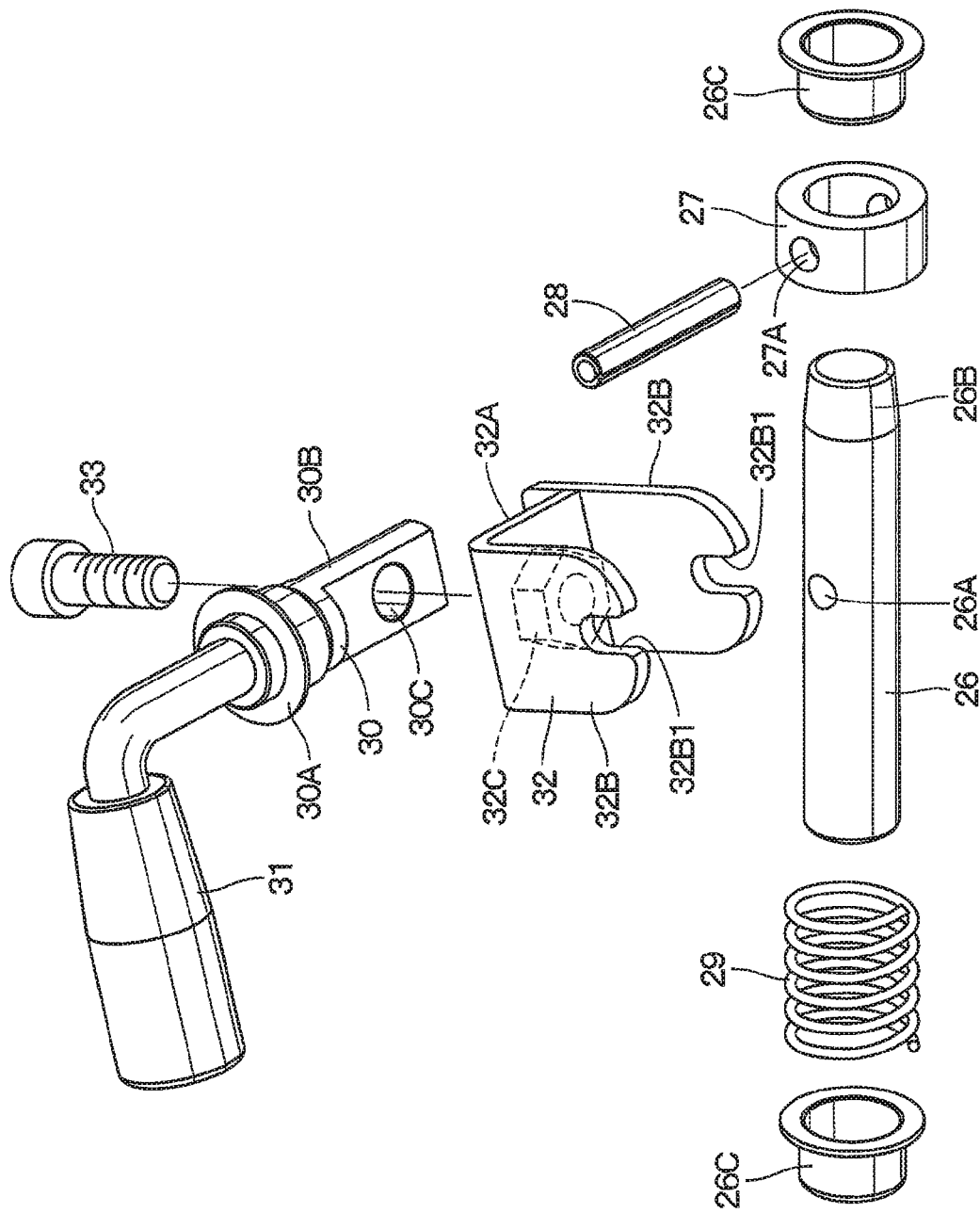
FIG. 12 is an exploded perspective view showing the moving part of the lock mechanism in FIG. 11 in an exploded manner.

Next, an explanation will be made of the right lock mechanism 25 that is a characteristic part of the present embodiment. The right lock mechanism 25 configures a lock mechanism together with the left lock mechanism 41. The right lock mechanism 25 fixes the right console 20 in an optional position. As shown in FIG. 10 to FIG. 12, the right lock mechanism 25 includes the five engaging holes 16B to 16F of the right front vertical plate 16 as described before, the lock case 20C of the right console 20, the later-described lock pin 26, the spring member 29, the rotating shaft 30, a lock release lever 31 and a convert member 32.

The lock pin 26 is provided in the lock case 20C of the right console 20. When the lock pin 26 performs a linear movement in an axial direction as a horizontal direction, the lock pin 26 is pulled in/out from the respective engaging holes 16B to 16F of the right front vertical plate 16. The lock pin 26 is formed of a columnar body elongated in the left-right direction, of which a pin insertion hole 26A (see FIG. 12) is formed in an intermediate position in the length direction to penetrate in a diameter direction. In addition, the tip end part 26B of the lock pin 26 is formed in a tapered shape to be reduced in diameter, which causes the tip end part 26B of the lock pin 26 to be easily inserted in the respective engaging holes 16B to 16F.

Here, a base end side of the lock pin 26 is inserted in the pin receiver 20C6 of the lock case 20C through a bush 26C, and a tip end side of the lock pin 26 is inserted in the pin receiver 20C5 of the lock case 20C through the bush 26C. Accordingly, the lock pin 26 is supported to be movable in a horizontal direction (in the left-right direction) to the lock case 20C. The lock pin 26 moves between a lock position (position as shown in FIG. 10) where the tip end part 26B projects from the pin receiver 20C5 of the lock case 20C and a lock release position where the tip end part 26B is pulled into the pin receiver 20C5.

On the other hand, an annular spring bearing 27 is provided to be fitted on an outer peripheral side of the lock pin 26. The spring bearing 27 is provided with a pin insertion hole 27A formed to penetrate in a diameter direction. The spring bearing 27 is arranged in an intermediate position of the lock pin 26 in the length direction for the pin insertion hole 27A to be communicated with the pin insertion hole 26A of the lock pin 26. When a connecting pin 28 is inserted/fitted in the pin insertion holes 26A, 27A respectively in this position, the spring bearing 27 is mounted in the lock pin 26. On the other hand, in a state where the connecting pin 28 is inserted/fitted in the respective pin insertion holes 26A, 27A, both end parts thereof project from the spring bearing 27, and the projected end parts can be engaged to elongated grooves 32B1 formed in respective bending plate parts 32B of the convert member 32.

A spring member 29 is positioned on the outer peripheral side of the lock pin 26 and is provided between the bush 26C and the spring bearing 27. The spring member 29 is formed as a compression coil spring, for example, and urges the lock pin 26 toward the respective engaging holes 16B to 16F sides.

The rotating shaft 30 is positioned closer to the upper side than the lock pin 26, and is provided to extend in the front-rear direction to the lock case 20C. The tip end side of the rotating shaft 30 projects to an exterior from the front surface part of the right console 20, that is, the front surface 20C1 of the lock case 20C. The rotating shaft 30 is inserted in the bearing 20C4 of the lock case 20C through a bush 30A to be rotatable thereto. In addition, a base end side of the rotating shaft 30 within the lock case 20C is formed as a mounting part 30B in a flat cuboid shape, and a bolt through hole 30C is formed in the mounting part 30B to penetrate in the plate thickness direction. On the other hand, the tip end side of the rotating shaft 30 extends forward from the lock case 20C.

Figure 3:
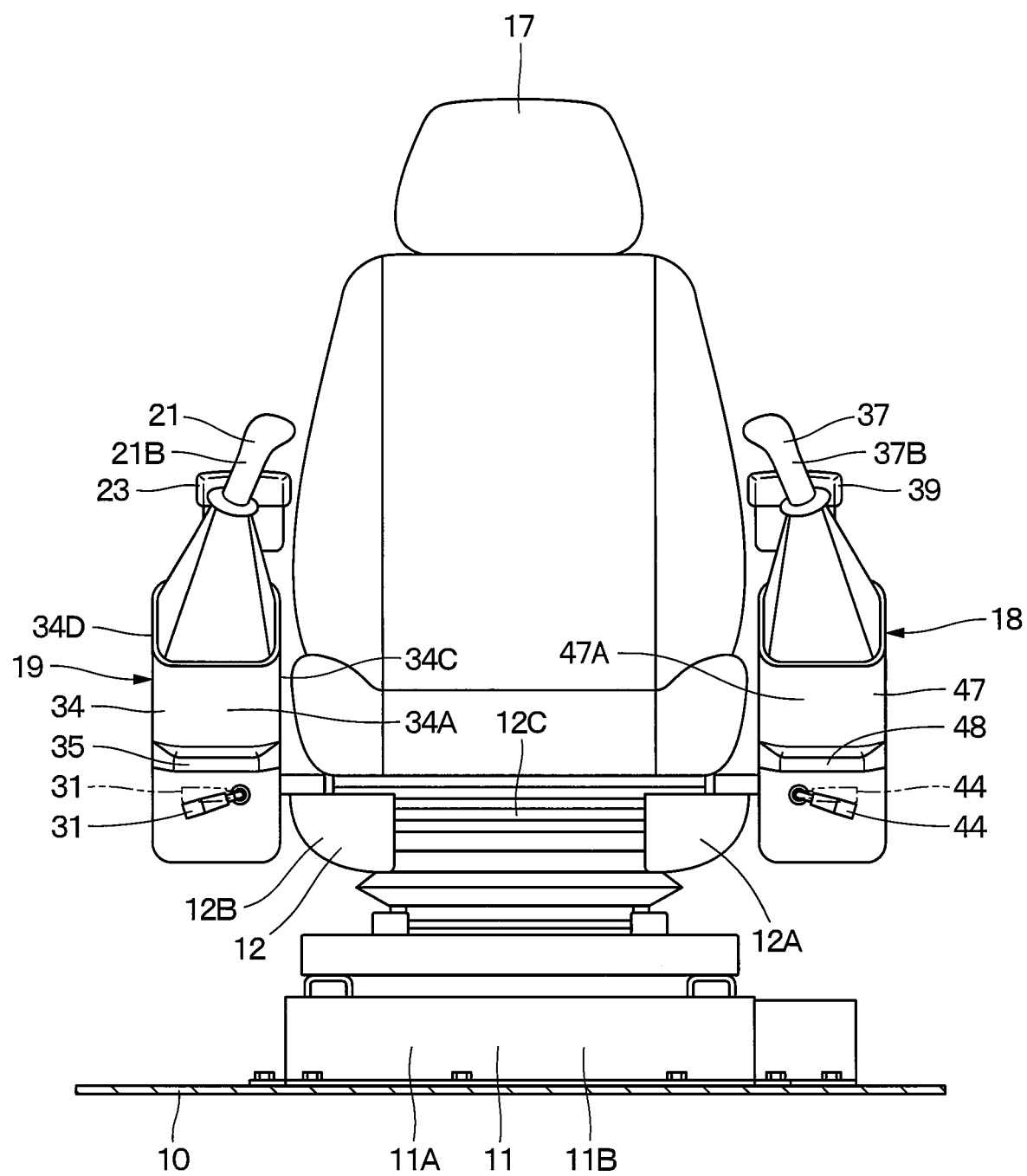
FIG. 3 is a front view showing the floor member, the operator's seat support platform, the fixed frame, the operator's seat, the left control lever device and the right control lever device as viewed from the front side.

The lock release lever 31 selects the lock state of fixing the right console 20 and the lock release state of releasing the fixation of the right console 20. The lock release lever 31 is provided to extend toward the outside (right side) in the left-right direction from the tip end position of the rotating shaft 30. The lock release lever 31 is formed as a grip that extends to bend in an L-letter shape from a tip end part of the rotating shaft 30, and is controlled by an operator. Here, as shown in FIG. 3 the lock release lever 31 takes an inclined posture where the tip end side is directed obliquely downward in the lock state where the lock pin 26 is arranged in the lock position.

On the other hand, the lock release lever 31 can arrange the lock pin 26 in the lock release position at a horizontal posture (posture indicated in a dashed-two dotted line in FIG. 3) where the lock release lever 31 is rotated upward from the inclined posture to be horizontal (lock release state). Therefore, since the lock release lever 31 becomes in parallel with a later-described right hand hold part 35 in the lock release state, it is possible to easily perform an up-movement and a down-movement of the right console 20 even in a state of gripping the lock release lever 31 together with the right hand hold part 35.

The convert member 32 is provided between the rotating shaft 30 and the lock pin 26. The convert member 32 converts a rotating movement of the rotating shaft 30 by the lock release lever 31 into a linear movement of the lock pin 26. The convert member 32 includes a mounting plate part 32A facing the mounting part 30B of the rotating shaft 30, and a pair of bending plate parts 32B that are bent from both ends of the mounting plate part 32A in the front-rear direction to be bent to the lock pin 26-side. A welding nut 32C with a screw hole is provided on a lower surface side of the mounting plate part 32A. An elongated groove 32B1 that slidably holds the connecting pin 28 therein is formed in a tip end part of each of the bending plate parts 32B. In addition, by causing the mounting plate part 32A to abut on the mounting part 30B of the rotating shaft 30 and a bolt 33 inserted in the bolt through hole 30C of the rotating shaft 30 to be screwed in the welding nut 32C in this state, the convert member 32 is formed to be integral with the rotating shaft 30.

As shown in FIG. 10, the convert member 32 rotates the respective bending plate parts 32B in a direction of arrow b when the lock release lever 31 rotates in a direction of arrow a. Therefore, the convert member 32 can linearly move the lock pin 26 in a direction of arrow c through the connecting pin 28 engaged to the elongated groove 32B1 of each of the bending plate parts 32B.

As shown in FIG. 2 to FIG. 4, the right console cover 34 is provided to cover the right console 20, the pilot valve 21A of the right control lever 21, the right damper 22 and the right lock mechanism 25. The right console cover 34 is formed in a box shape that is elongated in the front-rear direction, which has a front surface 34A, a top surface 34B, an inner surface 34C and an outer surface 34D. The right console cover 34 has the front side that is mounted to the cover mounting seats 20C7, 20C8 provided in the lock case 20C of the right console 20 by using bolts (not shown) and the rear side that is mounted to an unshown mounting seat provided in the right console 20 by using bolts.

The front surface 34A of the right console cover 34 as a front side of the right console 20 is provided thereon with the right hand hold part 35 as a hand hold part that is positioned above the lock release lever 31 and extends to an exterior. The right hand hold part 35 swings the right console 20 in the upper-lower direction in the lock release state where the fixation by the right lock mechanism 25 is released by the lock release lever 31. The right hand hold part 35 extends in parallel with the lock release lever 31 in the left-right direction and projects forward to be formed in a peaked shape in such a manner as to cover the upper side of the lock release lever 31. Further, the right hand hold part 35 is arranged near the upper side of the lock release lever 31 in such a manner as to be able to hold down the lock release lever 31 with a palm of the hand from the upper side and hang fingers of the hand on the lock release lever 31 in this state.

The right hand hold part 35 can swing the front side of the right console 20 downward against the urging force of the right damper 22 by pushing the right hand hold part 35 downward with a hand in the lock release state of the right lock mechanism 25. On the other hand, it is possible to swing the front side of the right console 20 upward with the urging force of the right damper 22 by relaxing the force added to the right hand hold part 35.

It should be noted that the left control lever device 18 includes, as similar to the right control lever device 19, the left console 36 having a main frame 36A, a lever mounting frame 36B, a lock case 36C, the support shaft 36D, a damper mounting part 36E and screw holes (not shown), the left control lever 37 having a pilot valve 37A of a pressure reducing valve type and a lever part 37B, the left damper 38, the left armrest 39, the left guide mechanism 40 composed of the guide groove 15G of the aforementioned left front vertical plate 15, the screw holes of the lever mounting frame 36B and a guide bolt 40A, and the left lock mechanism 41 composed of the five engaging holes 15B to 15F of the aforementioned left front vertical plate 15, the lock case 36C of the left console 36, a lock pin 42, spring members (not shown), a rotating shaft 43, a lock release lever 44, a convert member 45 and a bolt 46, a left console cover 47, and a lock mechanisms 25, 41. It should be noted that two to four or more of the engaging holes may be provided.

The left lock mechanism 41 that is one of the characteristic parts according to the present embodiment is provided with the lock release lever 44 that extends toward the outside (left side) in the left-right direction from a tip end position of the rotating shaft 43. The lock release lever 44, as similar to the lock release lever 31, takes an inclined posture where the tip end side is directed obliquely downward when the lock pin 42 is arranged in the lock position. On the other hand, the lock release lever 44 can arrange the lock pin 42 in the lock release position at a horizontal posture (posture indicated in a dashed-two dotted line in FIG. 3) where the lock release lever 44 is rotated upward from the inclined posture to be horizontal.

Here, the right lock release lever 31 and the left lock release lever 44 are respectively arranged to be directed outward in the left-right direction. Accordingly, when an operator controls the right lock release lever 31 with his or her right hand and controls the left lock release lever 44 with his or her left hand, the same control feeling can be given to the operator between both the right and left lock release levers 31, 41. Therefore, the operator can stably control the right lock release lever 31 and the left lock release lever 44 to easily perform the height adjustments of the left and right control lever devices 18, 19.

The hydraulic excavator 1 according to the present embodiment has the configured as described above, and next, an explanation will be made of the operation.

An operator who gets in the cab 8 and is seated on the operator's seat 17 controls the control lever/pedal (not shown) for traveling, thus making it possible to cause the lower traveling structure 2 to travel. In addition, by performing the tilting control of the control levers 37, 21 provided in the left and right control lever devices 18, 19, it is possible to perform the excavating work of earth and sand by performing the revolving movement of the revolving device 3 or the tilting/lifting movement of the front device 5.

Next, an explanation will be made of one example of the work in a case of adjusting the height adjustments in the right control lever 21 in the right control lever device 19 and in the left control lever 37 in the left control lever device 18 according to a physical size and preference of an operator, working contents, and/or the like.

An operator places a right hand's palm onto the right hand hold part 35 provided in the front side of the right console cover 34 and hangs fingers of the right hand on the lock release lever 31 laterally arranged near the lower side of the right hand hold part 35 in a state of being seated on the operator's seat 17. Likewise, the operator places a left hand's palm onto the lock mechanisms 25, 41 provided in the front side of the left console cover 47 and hangs fingers of the left hand on the lock release lever 44 laterally arranged near the lower side of the lock mechanisms 25, 41. In this state, the right lock release lever 31 and the left lock release lever 44 are caused to rotate upward. Accordingly, the fixation to the fixed frame 12-side by each of the lock mechanisms 25, 41 is released, making it possible to provide the lock release state. In this case, since it is possible to cause the force to effectively act on fingers by placing a palm of a hand onto each of the hand hold parts 35, 48, it is possible to rotate each of the lock release levers 31, 44 with a slight force.

In addition, when the fixations by the left and right lock mechanisms 25, 41 are released, the respective hand hold parts 35, 48 are pushed down with the palm of the hand, thus making it possible to swing the front sides of the consoles 20, 36 downward against the urging forces of the dampers 22, 38. On the other hand, it is possible to swing the front sides of the consoles 20, 36 upward with the urging forces of the dampers 22, 38 by relaxing the forces given to the hand hold parts 35, 48. At this time, since the lock release levers 31, 44 are horizontally arranged to be in parallel with the hand hold parts 35, 48, it is possible to easily maintain a state of gripping the lock release levers 31, 44 together with the hand hold parts 35, 48.

When the height position of each of the left and right control levers 21, 37 is arranged to a desired height position, each of the lock release levers 31, 44 is released. Therefore, the respective lock mechanisms 25, 41 can fix the consoles 20, 36 to the fixed frame 12-side in association with the movements of releasing the lock release levers 31, 44, thus making it possible to hold each of the control levers 21, 37 in the lock state at the desired height position.

Thus, according to the present embodiment, the lock mechanisms 25, 41 for fixing the consoles 20, 36 in optional positions are provided in front of the consoles 20, 36 respectively.

The lock mechanisms 25, 41 are respectively provided with the lock release levers 31, 44 for selecting the lock state of fixing the consoles 20, 36 and the lock release state of releasing the fixations of the consoles 20, 36. In addition, the lock release levers 31, 44 are provided to extend outward in the left-right direction from the lock mechanisms 25, 41 to the operator's seat 17, and an inclined posture in which the tip end sides of the lock release levers 31, 44 are directed obliquely downward is defined as the lock state and a horizontal posture in which the tip end sides of the lock release levers 31, 44 are rotated upward from the inclined posture is defined as the lock release state. Based upon this arrangement, the hand hold parts 35, 48 are provided in the front side of the consoles 20, 36 and in the upper side of the lock release levers 31, 44 to swing the consoles 20, 36 in the upper-lower direction in the lock release state where the fixations are released by the lock release levers 31, 44.

In this case, since the lock mechanisms 25, 41 (lock release levers 31, 44) are provided in front of the consoles 20, 36 in the control lever devices 19, 18 respectively, it is possible to increase a distance dimension from a position of a swing fulcrum (center axial line O-O) of the consoles 20, 36 to the lock release levers 31, 44. Accordingly, an operator can swing each of the control lever devices 19, 18 with the least force.

As a result, the height adjustment of the right control lever 21 can be performed with the right hand alone, and the height adjustment of the left control lever 37 can be performed with the left hand alone. Therefore, the works relating to the height adjustments of the right control lever 21 and the left control lever 37 can be simultaneously performed to shorten the adjustment working time. Further, when the works relating to the height adjustments of the right control lever 21 and the left control lever 37 are simultaneously performed, the adjustment is easier to perform as compared to a case of performing the adjustments separately, and therefore it is possible to shorten the adjustment working time.

The left and right lock release levers 44, 31 extend outward in the left-right direction from the tip end positions of the rotating shafts 43, 30. Based upon this structure, the lock pins 42, 26 are arranged in the lock position in the inclined posture where the tip end sides of the left and right lock release levers 44, 31 are directed obliquely downward, and the lock pins 42, 26 are arranged in the lock release position in the horizontal posture where the left and right lock release levers 44, 31 are rotated upward from the inclined posture. Accordingly, the control of each of the left and right lock release levers 44, 31 between the inclined posture and the horizontal posture can be performed with the same feeling to the left and right lock release levers 44, 31. Therefore, it is possible to stably perform the control of each of the left and right lock release levers 44, 31 to easily perform the height adjustments of the left and right control lever devices 18, 19.

On the other hand, the front surface 34A of the right console cover 34 as the front side of the right console 20 is provided with the right hand hold part 35 positioned on the upper side of the lock release lever 31. Accordingly, by placing a palm of a right hand onto the right hand hold part 35, the lock release lever 31 can be controlled with fingers, and further, the front side of the right console 20 can be swung in the upper-lower direction in a state where the lock is released by the lock release lever 31. Therefore, the height adjustment of the right control lever device 19 can be easily performed with one hand. The similar effect can be acquired in regard to the height adjustment of the left control lever device 18 as well.

The left and right lock mechanisms 25, 41 respectively are configured of the five engaging holes 16B to 16F and the five engaging holes 15B to 15F provided to be spaced in the upper-lower direction on the fixed frame 12-side, the lock pins 26, 42 that are provided in the consoles 20, 36 and are pulled into/from one engaging hole of the plurality of engaging holes 16B to 16F and 15B to 15F by performing the linear movements in the axial direction, the spring members 29 that urge the lock pins 26, 42 toward the engaging holes 16B to 16F and 15B to 15F, the rotating shafts 30, 43 the tip end sides of which extend in the front-rear direction and project from the front surfaces 34A, 47A of the consoles 20, 36 (console covers 34, 47) to an exterior and on the tip end positions of which the lock release levers 31, 44 are mounted, and the convert members 32, 45 that covert the rotating movements of the rotating shafts 30, 43 by the lock release levers 31, 44 into the linear movements of the lock pins 26, 42.

Accordingly, as shown in FIG. 10, the right lock mechanism 25 can convert the rotating movement of the lock release lever 31 in a direction of arrow a into a movement of linearly moving the lock pin 26 in a direction of arrow c by the convert member 32. As a result, it is possible to enhance controllability of the right lock mechanism 25, and in this point as well, it is possible to easily perform the adjustment work for a short time. The effect as similar to that of the right lock mechanism 25 can be acquired in the left lock mechanism 41 as well.

Since the left and right lock release levers 44, 31 and the hand hold parts 48, 35 are arranged in front of the consoles 36, 20 respectively, a space in the inside of the cab 8 in the left-right direction cannot be compressed. Accordingly, the operator's seat 17 can be widened to improve comfortability of an operator at the working.

The fixed frame 12 includes the left base frame 12A and the right base frame 12B that are arranged to be spaced from each other in the left-right direction. The console support brackets 13, 14 having a fulcrum (center axial line O-O) are arranged on the rear side of the left base frame 12A and the right base frame 12B, respectively. The front vertical plate 15 having the engaging holes 15B to 15F and the front vertical plate 16 having the engaging holes 16B to 16F are arranged on the front side of the left base frame 12A and the right base frame 12B respectively. Accordingly, the left console 36 can be mounted to the left base frame 12A to be adjustable in position through the left console support bracket 13 and the left front vertical plate 15. The right console 20 can be mounted to the right base frame 12B to be adjustable in position through the right console support bracket 14 and the right front vertical plate 16.

The right guide mechanism 24 is arranged between the right console 20 and the right front vertical plate 16 to guide the right console 20 along the right front vertical plate 16 when the right console 20 is caused to swing. In addition, the right guide mechanism 24 is configured of the arc-shaped guide groove 16G extending in the upper-lower direction at the center of a fulcrum (center axial line O-O) of the right console support bracket 14 provided in the right front vertical plate 16, the screw hole 20F provided to correspond to the guide groove 16G on the inner surface part 20B2 of the lever mounting frame 20B of the right console 20 facing the right front vertical plate 16, and the guide bolt 24A inserted in the guide groove 16G to be screwed into the screw hole 20F.

Accordingly, the right guide mechanism 24 can retain the right front vertical plate 16 by and between the inner surface part 20B2 of the lever mounting frame 20B and the head part of guide bolt 24A to guide the front side of the right console 20 in such a manner as not to shake in the left-right direction. Therefore, since it is not necessary to provide the structure of retaining the right console 20 therebetween in the left-right direction, the structure of the right control lever device 19 can be simplified. The similar effect can be acquired in the left control lever device 18 as well.

It should be noted that the embodiment is explained by taking the control lever devices 18, 19 of the hydraulic excavator 1 as a control lever device for a construction machine, as an example. However, the present invention is not limited thereto, but may be applied widely to other construction machines such as a hydraulic crane or a wheel loader.

DESCRIPTION OF REFERENCE NUMERALS

1: Hydraulic excavator (Construction machine)
5: Front device
12: Fixed frame
12A: Left base frame
12B: Right base frame
13: Left console support bracket
14: Right console support bracket
15: Left front vertical plate
15B to 15F, 16B to 16F: Engaging hole
15G, 16G: Guide groove
16: Right front vertical plate
17: Operator's seat
18: Left control lever device
19: Right control lever device
20: Right console
20A, 36A: Main frame
20B, 36B: Lever mounting frame
20C, 36C: Lock case
20C1: Front surface (front surface part)
20D, 36D: Support shaft
20F: Screw hole
21: Right control lever
22: Right damper (Urging member)
24: Right guide mechanism
24A, 40A: Guide bolt
25: Right lock mechanism
26, 42: Lock pin
29: Spring member
30, 43: Rotating shaft
31, 44: Lock release lever
32, 45: Convert member
34: Right: console cover
34A, 47A: Front surface
35: Right hand hold part
36: Left console
37: Left control lever
38: Left damper (Urging member)
40: Left guide mechanism
41: Left lock mechanism
47: Left console cover
48: Left hand hold part
O-O: Center axial line (Fulcrum)

The invention claimed is:

1. A control lever device for a construction machine comprising:
left and right consoles that are arranged on both left and right sides of an operator's seat and a front side of which can swing in an upper-lower direction about a rear side as a fulcrum attached on a fixed frame;
control levers that are provided on said left and right consoles to control a front device; and urging members that urge said respective consoles configuring said left and right consoles such that the front sides of said left and right consoles swing upward, wherein a lock mechanism is provided in front of each of said consoles to fix said console in an optional position;

a lock release lever is provided on each of said lock mechanisms to select a lock state of fixing said console and a lock release state of releasing the fixation of said console, said lock release lever being provided to extend outward in a left-right direction to said operator's seat from said lock mechanism, said lock state being defined by an inclined posture in which a tip end side of said lock release lever is in an oblique downward direction and said lock release state being defined by a horizontal posture in which said lock release lever is rotated in an upward direction from said inclined posture; and a hand hold part is provided in front of each of said consoles and above each of said lock release levers to cause said console to swing in the upper-lower direction in said lock release state in which the fixation of said console is released by said lock release lever.

2. The control lever device for the construction machine according to claim 1, wherein a plurality of engaging holes are provided in the front side of said fixed frame at both left and right sides to be spaced in the upper-lower direction, said lock mechanisms each include:

a lock pin that is pulled into/from one engaging hole of said plurality of engaging holes by performing a linear movement in the axial direction;

a spring member that urges said lock pin toward said engaging hole;

a rotating shaft that projects from a front surface of said console to a front side in the front-rear direction and is provided with said lock release lever on a tip end position of said rotating shaft; and a convert member that converts a rotating movement of said rotating shaft by said lock release lever into the linear movement of said lock pin, wherein in said lock state, said lock pin is inserted in one engaging hole of said plurality of engaging holes, and in said lock release state, said lock pin is disengaged from said one engaging hole to release the fixation.

3. The control lever device for the construction machine according to claim 2, wherein said fixed frame includes a left base frame and a right base frame that are arranged to be spaced from each other in the left-right direction, console support brackets having said fulcrum are arranged in the rear side of said left base frame and said right base frame respectively, and front vertical plates having said plurality of engaging holes are provided in the front side of said left base frame and said right base frame, respectively.

4. The control lever device for the construction machine according to claim 3, wherein guide mechanisms each are provided between said console and said front vertical plate to guide said console along said front vertical plate when said console is caused to swing, and said guide mechanisms each include:

an arc-shaped guide groove that is provided in said front vertical plate and extends in the upper-lower direction at the center of said fulcrum of said console support bracket;

a screw hole that is provided to correspond to said guide groove on an inner surface part of said console facing said front vertical plate; and a guide bolt that is inserted in said guide groove to be screwed into said screw hole.

* * * * *